United States Patent
Zheng et al.

(10) Patent No.: US 7,520,063 B2
(45) Date of Patent: Apr. 21, 2009

(54) DEVICE WITH PRECISE TIP-TILT ADJUSTMENT

(75) Inventors: Bing Zheng, Sunnyvale, CA (US); Joseph Christman, San Jose, CA (US)

(73) Assignee: Bookham Technology plc, Northhamptonshire (GB)

( * ) Notice: Subject to any disclaimer, the term of this patent is extended or adjusted under 35 U.S.C. 154(b) by 0 days.

(21) Appl. No.: 11/717,863

(22) Filed: Mar. 13, 2007

(65) Prior Publication Data
US 2007/0216984 A1    Sep. 20, 2007

Related U.S. Application Data

(60) Provisional application No. 60/782,359, filed on Mar. 14, 2006.

(51) Int. Cl.
*G02B 26/08* (2006.01)
(52) U.S. Cl. .......................... 33/286; 248/481; 359/212
(58) Field of Classification Search ................... 33/286; 359/223–226, 212–214; 248/479, 481
See application file for complete search history.

(56) References Cited

U.S. PATENT DOCUMENTS

| | | | |
|---|---|---|---|
| 4,037,942 A | | 7/1977 | Guyer |
| 5,007,175 A | * | 4/1991 | Schwarz ...................... 33/286 |
| 5,754,327 A | * | 5/1998 | Masotti et al. ............... 359/225 |
| 2006/0042105 A1 | * | 3/2006 | McGrail et al. ............... 33/286 |
| 2006/0059699 A1 | * | 3/2006 | Krantz et al. ................. 33/286 |

OTHER PUBLICATIONS

International Search Report and Written Opinion for PCT/US07/06325 (related to the present application), publication date Jul. 14, 2008, Bookham Technology plc.
International Preliminary Report on Patentability for PCT/US07/06325 (related to the present application), publication date Sep. 25, 2008, Bookham Technology plc.

* cited by examiner

*Primary Examiner*—G. Bradley Bennett
(74) *Attorney, Agent, or Firm*—Roeder & Broder LLP (57) ABSTRACT

A device assembly (216) for positioning a device (222) in a precision apparatus (10) includes a first housing (224), a second housing (226), a movement ball joint (229), and a locking ball joint (249). The first housing (224) retains the device (222). The second housing (226) is coupled to an apparatus frame (12). The movement ball joint (229) facilitates movement of the first housing (224) relative to the second housing (226). The locking ball joint (249) facilitates locking of the first housing (224) to the second housing (226). The movement ball joint (229) can guide movement of the first housing (224) relative to the second housing (226). For example, the first housing (224) can include a first guide surface (230) and the second housing (226) can include a second guide surface (232). In this embodiment, the guide surfaces (230) (232) cooperate to form the movement ball joint (229). Additionally, each of the guide surfaces (230) (232) can form a portion of a sphere.

29 Claims, 8 Drawing Sheets

DEVICE WITH PRECISE TIP-TILT ADJUSTMENT

RELATED APPLICATION

This application claims priority on Provisional Application Ser. No. 60/782,359 filed on Mar. 14, 2006 and entitled "DEVICE WITH PRECISE TIP-TILT ADJUSTMENT". As far as is permitted, the contents of Provisional Application Ser. No. 60/782,359 are incorporated herein by reference.

BACKGROUND

Optical mirrors are commonly used in precision apparatuses to make precise adjustments to the path of a beam. For example, the precision apparatus can include a beam source that generates a beam, an object, and an optical mirror that redirects the beam at the object.

Unfortunately, many precision apparatuses have one or more disadvantages, such as a relatively small angular adjustment range, a relatively large angular resolution, a relatively large size, and/or are relatively difficult to manufacture or assemble. Moreover, some precision apparatuses have limited holding force against environmental disturbances or heavy loads.

SUMMARY

The present invention is directed to a device assembly for positioning a device in a precision apparatus that includes an apparatus frame. The device assembly includes a first housing, a second housing, a movement ball joint, and a locking ball joint. The first housing retains the device. The second housing is coupled to the apparatus frame or is directly manufactured as part of the apparatus frame (in which case the apparatus frame and the second housing are the same object). The movement ball joint facilitates movement of the first housing relative to the second housing. The locking ball joint facilitates locking of the first housing to the second housing.

As an overview, in certain embodiments, the movement ball joint facilitates precise movement over a relatively large adjustment range of the first housing relative to the second housing. Further, the locking ball joint facilitates the precise locking of the first housing to the second housing to inhibit relative movement between the housings. Moreover, in certain embodiments; the device assembly is compact in size and has a simplified configuration for ease of assembly and manufacturing.

In one embodiment, the movement ball joint guides movement of the first housing relative to the second housing. For example, the first housing can include a first guide surface and the second housing can include a second guide surface. In this embodiment, the guide surfaces cooperate to form the movement ball joint. Additionally, each of the guide surfaces can form a portion of a sphere. Moreover, at least one of the guide surfaces can encircle the device and the guide surfaces and the device can be substantially concentric.

Additionally, the device assembly can include a fastener that selectively locks the first housing to the second housing. In this embodiment the fastener cooperates with the first housing to form the locking ball joint. For example, the fastener can extend through the first housing and selectively thread into the second housing.

The present invention is also directed to a device assembly that includes a device, a first housing, and a second housing. In this embodiment, the first housing includes a first guide surface and the second housing includes a second guide surface that cooperates with the first guide surface to form a movement ball joint that guides movement of the first housing relative to the second housing. In this embodiment, the second guide surface can include a device aperture that is positioned adjacent go the device. With this design, an optical beam can be directed at the device through the movement ball joint.

Additionally, the present invention is directed to a method for positioning a device. In one embodiment, the method includes the steps of retaining the device with a first housing, coupling a second housing to an apparatus frame, facilitating movement of the first housing relative to the second housing with a movement ball joint, and locking the first housing to the second housing utilizing a locking ball joint.

Additionally, the present invention is also directed to a precision apparatus that includes a beam source that generates a beam, an object, and the optical assembly directing the beam at the object.

Moreover, the present invention is also directed to a method for redirecting a beam on a beam path.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
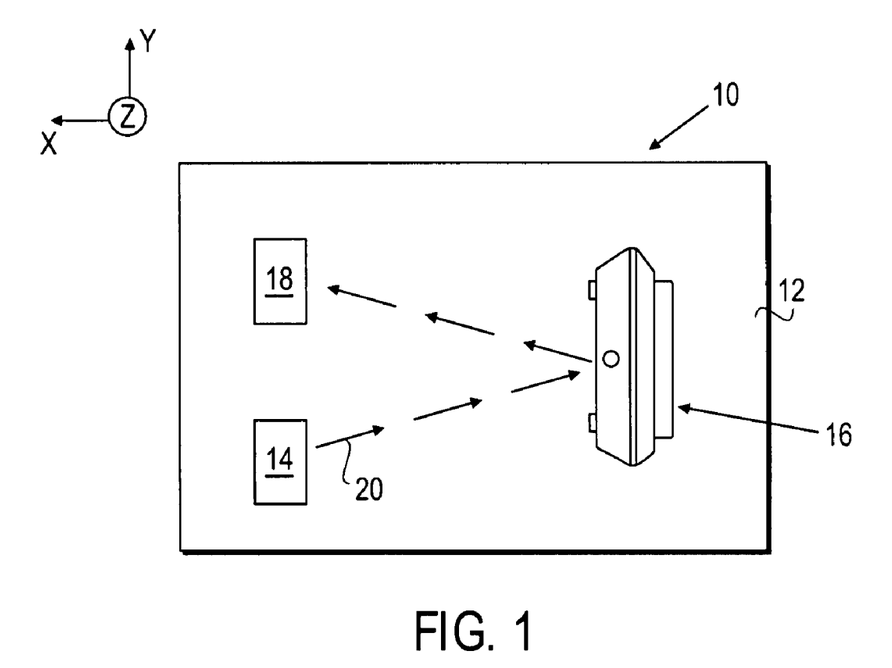
FIG. 1 is a simplified top illustration of a precision apparatus having features of the present invention.

Referring to FIG. 1, the present invention is directed to a precision apparatus 10 that, for example, can be used in manufacturing, technical or scientific instruments. As an example, the precision apparatus 10 can be a measurement system, e.g. a laser interferometer, encoder, other measuring device, a laser cutting tool and/or other manufacturing device. The design and orientation of the components of the precision apparatus 10 can be changed to suit the requirements of the precision apparatus 10. FIG. 1 is a simplified top view of one, non-exclusive example of the precision apparatus 10. In this embodiment, the precision apparatus 10 includes an apparatus frame 12, a beam source 14, a device assembly 16, and an object 18. However, one or more of these components can be optional.

A number of Figures include an orientation system that illustrates an X axis, a Y axis that is orthogonal to the X axis, and a Z axis that is orthogonal to the X and Y axes. It should be noted that any of these axes can also be referred to as the first, second, and third axes. In general, there are six degrees of freedom, including translation along the X, Y and Z axes and rotation about the X, Y and Z axes.

The apparatus frame 12 retains and/or supports the other components of the precision apparatus 10. In one embodiment, the apparatus frame 12 is generally rectangular plate shaped and is made of a rigid material.

The beam source 14 generates a beam 20 (illustrated as arrows) of light energy that is directed at the device assembly 16. In one embodiment, the beam source 14 is a laser source and the beam 20 is a small diameter optical beam.

The device assembly 16 is positioned in the path of the beam 20. In one embodiment, the device assembly 16 is an optical assembly that redirects the beam 20 at the object 18. In certain embodiments, the device assembly 16 can be used to precisely change and adjust the path of the beam 20. Stated in another fashion, in certain embodiments, the new design provides a simple way to control beam pointing by adjusting mirror position along a partial spherical surface and to maintain beam pointing as stable as micro-radius level over a relatively large temperature range.

Alternatively, for example, the device assembly 16 can be used to otherwise alter the beam.

As non-exclusive examples, the object 18 can be a mirror, lens, telescope, filter, emitter, sensor, and/or detector.

Figure 2A:
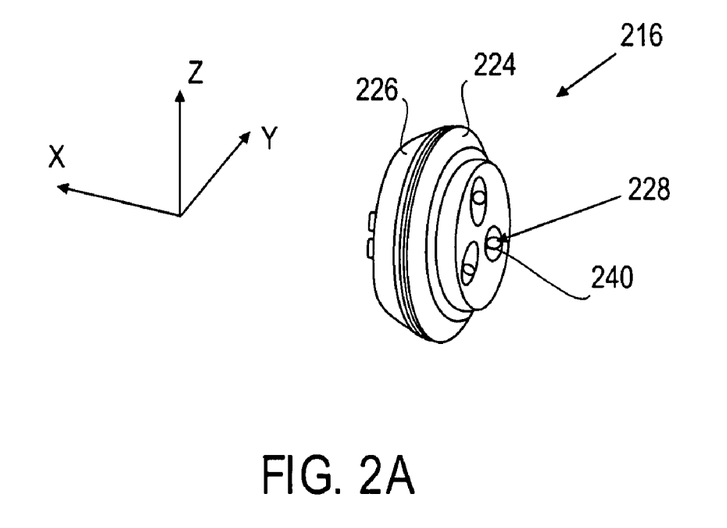
FIG. 2A is perspective view of a first embodiment of a device assembly having features of the present invention.
Figure 2B:
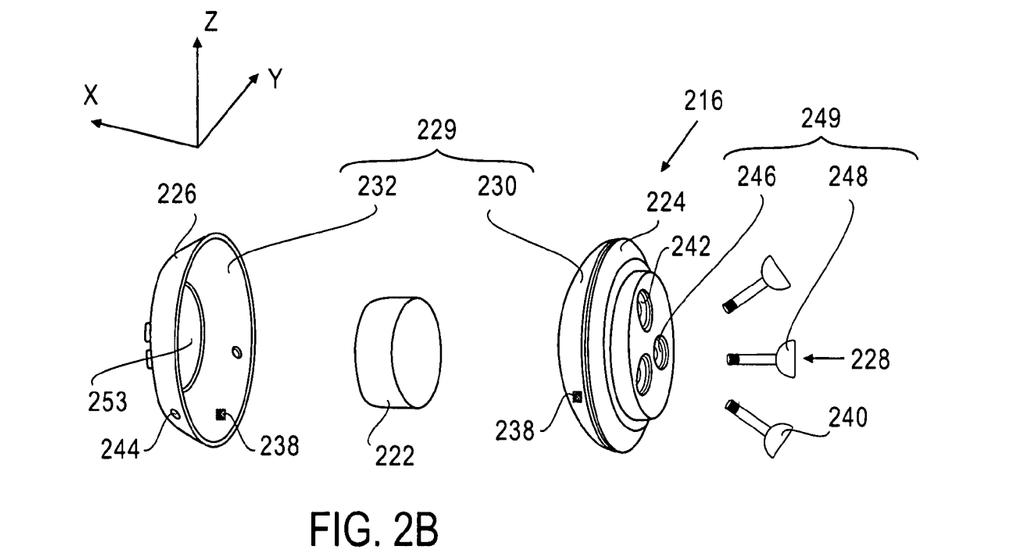
FIG. 2B is an exploded perspective view of the device assembly of FIG. 2A.

FIG. 2A is a perspective view and FIG. 2B is an exploded perspective view of a first embodiment of a device assembly 216 having features of the present invention. In this embodiment, the device assembly 216 includes a device 222 that is precisely positioned, a first housing 224 that retains the device 222, a second housing 226 the facilitates movement of the first housing 224, and a lock assembly 228 that selectively locks the first housing 224 to the second housing 226. The size, shape, and design of each of these components can be varied to achieve the design requirements for the device assembly 216. It should be noted that the device assembly 216 can be designed without one or more of the components described above.

In FIGS. 2A and 2B, the device assembly 216 allows for the precise positioning of the device 222 about three axes, namely about the X axis, about the Y axis and about the Z axis.

As an overview, in certain embodiments, the device assembly 216 includes a movement ball joint that facilitates precise movement over a relatively large adjustment range of the first housing 224 relative to the second housing 226, and a locking ball joint that facilitates the precise locking of the first housing 224 to the second housing 226 to inhibit relative movement between the housings 224, 226. The locking ball joint is shaped such that it does not induce relative motions between the housings 224, 226 due to the force of the locking action, because the point of contact between the lock and the second housing 226 does not change while in locked or free states. Moreover, in certain embodiments, the device assembly 216 is compact in size and has a simplified configuration for ease of assembly and manufacturing.

The device 222 is positioned by the device assembly 216. In one embodiment, the device 222 is an optical element that can be used to redirect (reflect) the beam 20 (illustrated in FIG. 1) that is directed to the object 18 (illustrated in FIG. 1). In one embodiment, the optical element is a generally disk shaped reflective element, e.g. a mirror. Alternatively, for example, the optical element can be an optical filter, a polarizer, a prism, a filter wheel, a light source, a beam steerer, or another type of optical component or source.

The first housing 224 retains the device 222 and provides a rigid frame for securing the device 222. In certain embodiments, the first housing 224 supports the device 222 so that the device 222 can be moved without distorting or damaging the device 222. In one embodiment, the device 222 is secured to the first housing 224 with an adhesive (not shown). Alternatively, the device can be secured to the first housing 224 in another fashion.

In the embodiment illustrated in FIGS. 2A and 2B, the second housing 226 guides the movement of the first housing 224 and supports the other components of the device assembly 216. For example, the second housing 226 can be fixedly secured to the apparatus frame 12 (illustrated in FIG. 1) and the rest of the device assembly 216 can be moved relative to the apparatus frame 12 to precisely position the device 222.

The first housing 224 and the second housing 226 can be made of a rigid material. Non-exclusive examples of suitable materials include steel, plastic, aluminum, or invar.

In one embodiment, the first housing 224 and the second housing 226 cooperate to form a movement ball joint 229 that allows for the precise positioning of the device 222. More specifically, the first housing 224 can include a first guide surface 230, and the second housing 226 can include a corresponding second guide surface 232 that interacts with the first guide surface 230 to form the movement ball joint 229. For example, one of the guide surfaces 230, 232 can define a portion of a spherical cavity and the other of the guide surfaces 232, 230 can define a portion of a spherical projection that is sized and shaped to fit within the spherical cavity. In the embodiment illustrated in FIG. 2B, the second guide surface 232 defines a portion of the spherical cavity and the first guide surface 230 defines a portion of the spherical projection. With this design, the first guide surface 230 fits within and is guided by the second guide surface 232. As a result thereof, the orientation of the device 222 can be adjusted smoothly with micro-radian angle resolution. Further, as provided below, the lock assembly 228 locks the device 222 in place after the device 222 is precisely positioned so that the movement ball joint 229 has very high angular stability in the micro-radian level.

In one embodiment, one or both of the guide surfaces 230, 232 are coated with a low friction coating 238 (illustrated as cross-hatching). In FIG. 2B both guide surfaces 230, 232 are coated with a low friction coating 238. As a result thereof, the first housing 224 can be moved relative to the second housing 226 with relatively low friction and in a highly consistent fashion. This allows for precise and easily repeatable positioning of device 222.

The lock assembly 228 selectively secures and locks the first housing 224 to the second housing 226. In one embodiment, the lock assembly 228 includes three spaced apart bolts 240, the first housing 224 includes three spaced apart first housing apertures 242, and the second housing 226 includes three spaced apart second housing internally threaded surfaces 244. With this design, each bolt 240 extends through one of the first housing apertures 242 and is threaded into one of the second housing threaded surfaces 244.

In one embodiment, the diameter of each first housing aperture 242 is greater than the diameter of each bolt 240. With this design, the first housing 224 can be moved relative to the second housing 226 with each bolt 240 threaded into one of the second housing threaded surfaces 244.

Additionally, the first housing 224 includes a first engagement surface 246 at each first housing aperture 242 that is engaged by a second engagement surface 248 of the corresponding bolt 240. In one embodiment, the engagement surfaces 246, 248 cooperate to form a locking ball joint 249 that allows for precise locking of the housings 224, 226 together. For example, one of the engagement surfaces 246, 248 can define a portion of a spherical cavity and the other of the engagement surfaces 246, 248 can define a portion of a spherical projection that is sized and shaped to fit within the spherical cavity. In the embodiment illustrated in FIG. 2B, the first engagement surface 246 defines a portion of the spherical cavity and the second engagement surface 248 defines a portion of the spherical projection. With this design, the second engagement surface 240 fits within and precisely engages the first engagement surface 246. This unique arrangement allows the lock assembly 228 to clamp the housings 224, 226 together irregardless of the relative positions of the housings 224, 226 while maintaining the positions of the housings 224, 226. Further, the lock assembly 228 can secure the housings 224, 226 without urging the housings 224, 226 back to another position.

With this design, there are two ball type joints 229, 249 used in the device assembly 216, namely the movement ball joint 229 between the adjustable first housing 224 and the second guide surface 232 of the second housing 226, and the locking ball joint 249 between the bolt 240 and the engagement surface 246 of the first housing 224.

In FIG. 2B, the first engagement surface 246 is directly formed in the first housing 224 and the second engagement surface 248 is directly formed in head of each bolt 240. Alternatively, one or more formed washers (not shown) can be used to define one or more of the engagement surfaces 246, 248.

In one embodiment, each engagement surface 246, 248 is coated with a low friction coating (not shown) or made of a low friction material. As a result thereof, the engagement surfaces 246, 248 can engage each other with relatively low friction and in a highly consistent fashion. This allows for precise and easily repeatable locking of device 222.

Alternatively, for example, lock assembly 228 can include more than three or less than three bolts 240 or the lock assembly 228 can be another type of clamp.

In one embodiment, when the bolts 240 are loose, the user can manually move the first housing 224 relative to the second housing 226. Alternatively, a separate electronic mover assembly can be used to move the first housing 224 relative to the second housing 226. Upon precise positioning of the device 222, the bolts 240 can be tightened for inhibit further relative movement between the second housing 226 and the device 222.

Additionally, in one embodiment, the second housing 226 includes a device aperture 253 in the second guide surface 232. Further, the device aperture 253 is positioned adjacent to and in front of the device 222. With this design, the optical beam 20 (illustrated in FIG. 1) can be directed at the device 222.

Figure 2C:
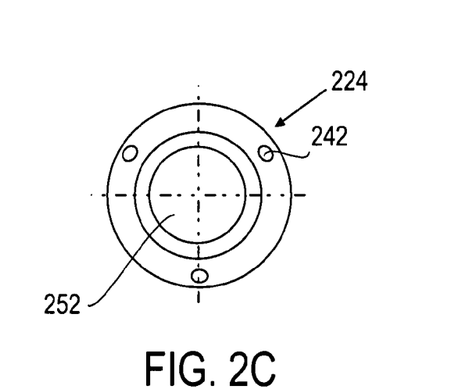
FIG. 2C is a front view of a first housing having features of the present invention.
Figure 2D:
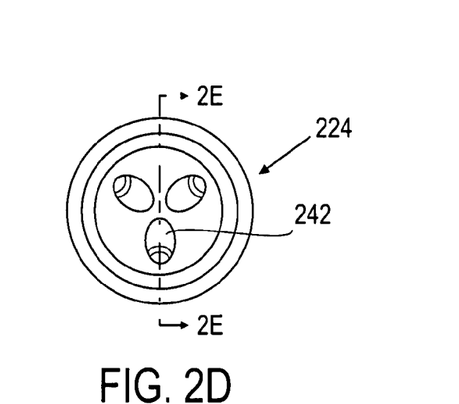
FIG. 2D is a rear view of the first housing of FIG. 2C.
Figure 2E:
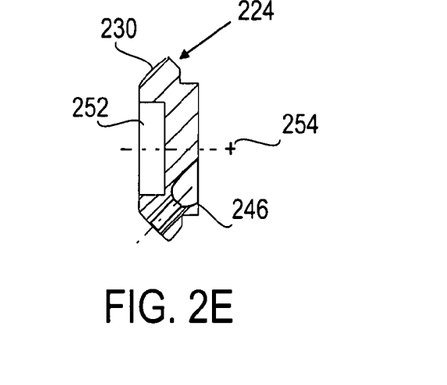
FIG. 2E is a cut-away view of the first housing taken from FIG. 2D.

FIG. 2C is a front view, FIG. 2D is a rear view, and FIG. 2E is a cross-sectional view of the first housing 224. In this embodiment, the first housing 224 includes a right cylindrical shaped device aperture 252 that is sized to receive the device 222 (illustrated in FIG. 2B).

FIGS. 2C and 2D illustrate that the first housing apertures 242 are equally spaced apart radially. In this embodiment, the first housing apertures 242 are spaced apart approximately 180 degrees.

Additionally, FIG. 2E illustrates that the first guide surface 230 and the first engagement surface 246 (only one is illustrated in FIG. 2E) each have the same spherical center 254.

Figure 2F:
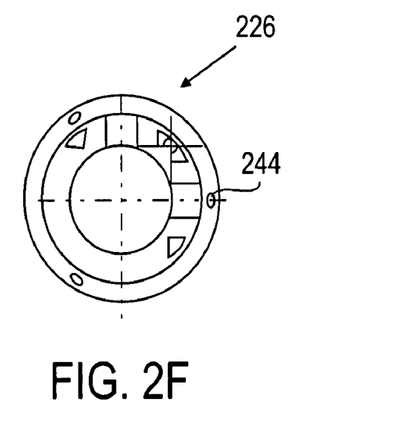
FIG. 2F is a front view of a second housing having features of the present invention.
Figure 2G:
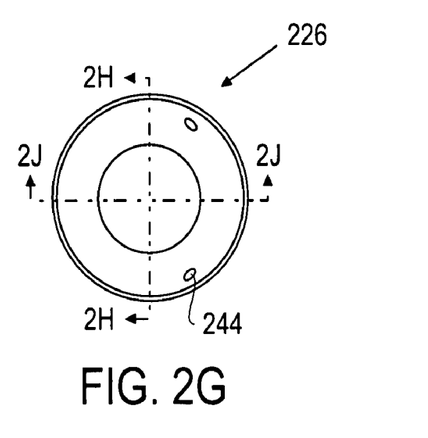
FIG. 2G is a rear view of the second housing.
Figure 2H:
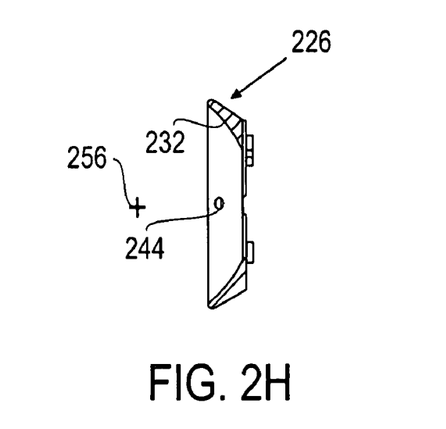
FIG. 2H is a cross-sectional view taken from FIG. 2G.
Figure 2I:
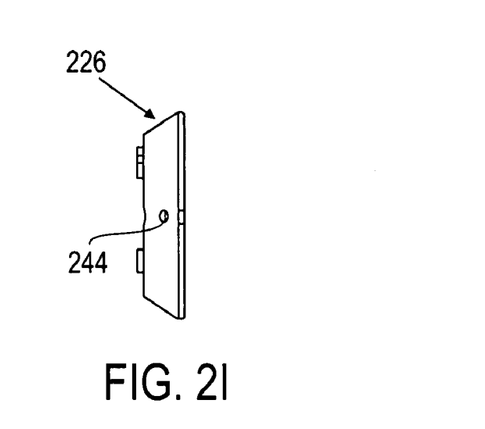
FIG. 2I is a side view of the second housing.
Figure 2J:
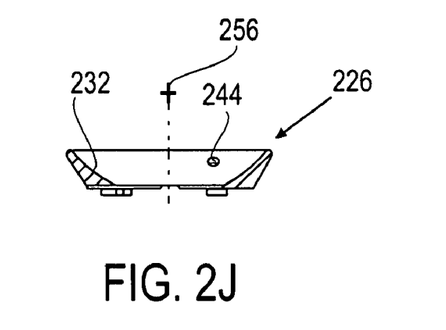
FIG. 2J is a cross-sectional view taken from FIG. 2G.
Figure 2K:
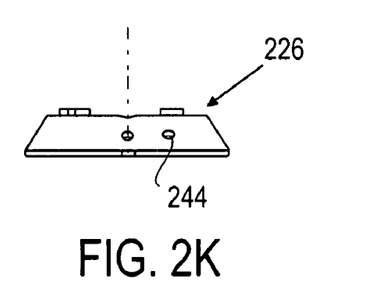
FIG. 2K is another side view of the second housing.

FIG. 2F is a front view, FIG. 2G is a rear view, FIGS. 2H is a first cross-sectional view, FIG. 2I is a side view, FIGS. 2J is a second cross-sectional view, and FIG. 2K is another side view of the second housing 226.

These Figures illustrate that the second housing internally threaded surfaces 244 are equally spaced apart radially. In this embodiment, the second housing internally threaded surfaces 244 are spaced apart approximately 180 degrees. Additionally, FIGS. 2H and 2J illustrates that the second guide surface 232 has a spherical center 256.

Figure 2L:
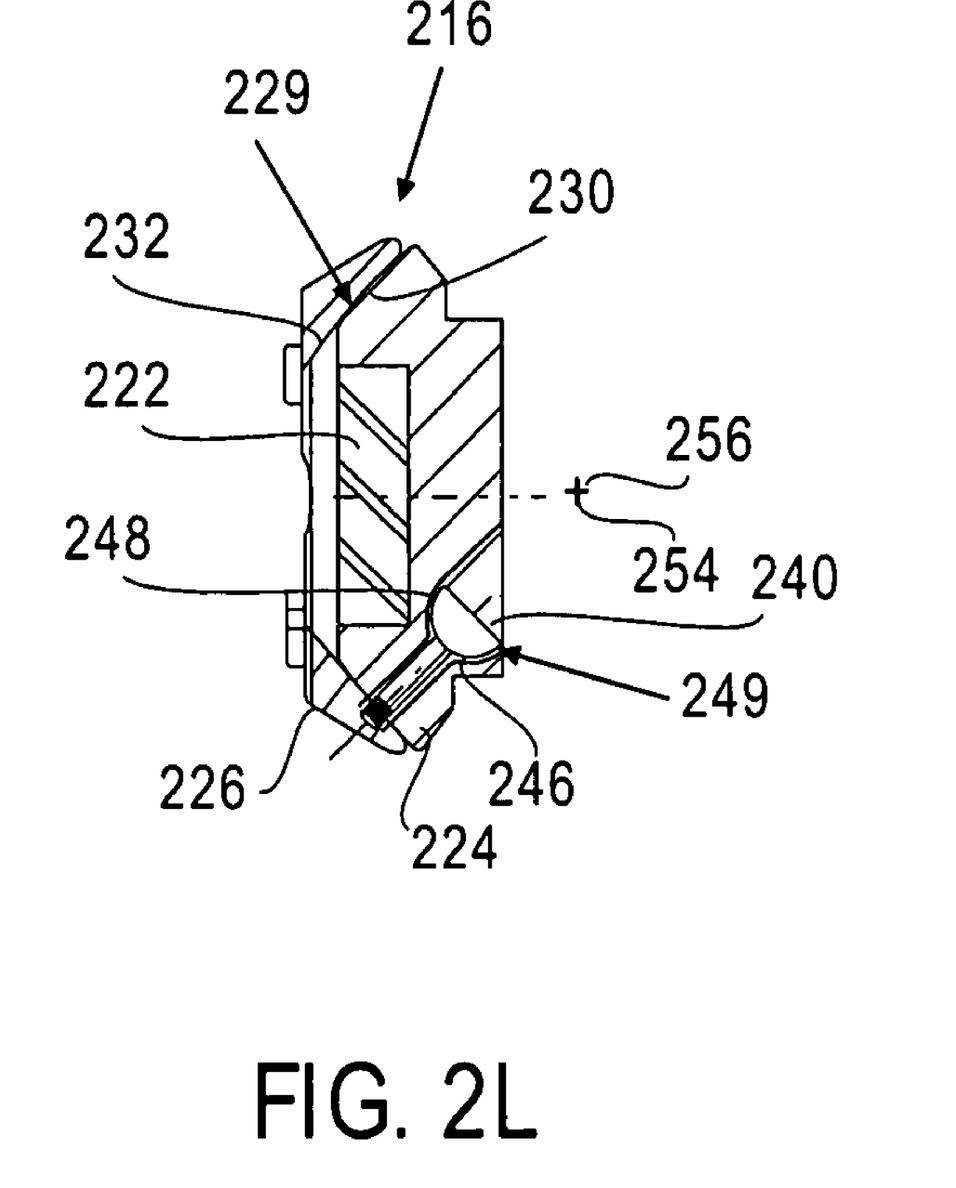
FIG. 2L is a cross-sectional view of the device assembly of FIG. 2B.

FIG. 2L is a cross-sectional view taken from FIG. 2A. This Figure illustrates that when the device assembly 216 is assembled, the spherical center 256 of the second guide surface 232 is the same as the spherical center 254 of the first guide surface 230 and the first engagement surface 246.

FIG. 2L further illustrate (i) the movement ball joint 229 between the first guide surface 230 of the first housing 224 and the second guide surface 232 of the second housing 226, and (ii) the locking ball joint 249 between second engagement surface 248 of the bolt 240 and the first engagement surface 246 of the first housing 224.

FIG. 2L also illustrates that the first guide surface 230, the second guide surface 232 and the movement ball joint 229 can encircle the device 222 and can be substantially coaxial with the device 222.

Figure 2M:
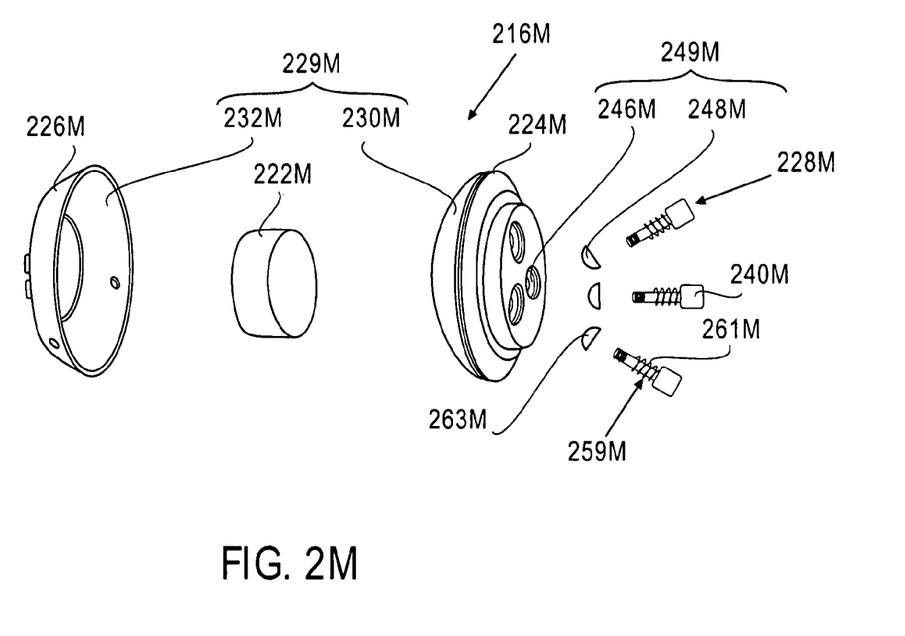
FIG. 2M is an exploded perspective view of another embodiment of a device assembly having features of the present invention.

FIG. 2M is an exploded perspective view of another embodiment of a device assembly 216M having features of the present invention. In this embodiment, the device assembly 216M includes the device 222M, the first housing 224M, the second housing 226M, and the lock assembly 228M that are similar to the corresponding components described above and illustrated in FIG. 2M. However, in this embodiment, the device assembly 216M includes a resilient assembly 259M that urges the components of the movement ball joint 229M together and urges the components of the locking ball joint 249M together when the lock assembly 22M is not locked.

The design of the resilient assembly 259M can vary. In the embodiment illustrated in FIG. 2M, the resilient assembly 259M includes a plurality of resilient members 261M, e.g. springs that urge the components of the movement ball joint 229M together and urge the components of the locking ball joint 249M together while still allowing for movement.

In this embodiment, each of the second engagement surfaces 248M is defined by a washer 263M that is positioned on each of the bolts 240M. In this embodiment, the washer 263M forms a portion of the sphere. Further, the resilient member 261M is positioned between the head of the bolt 240M and the washer 263M to urge the washer 263M against the first engagement surface 246M even in the bolt 240M not tightened. This also urges the first guide surface 230M and the second guide surface 232M together.

Alternatively, the resilient assembly 259M can have a different design.

Figure 3A:
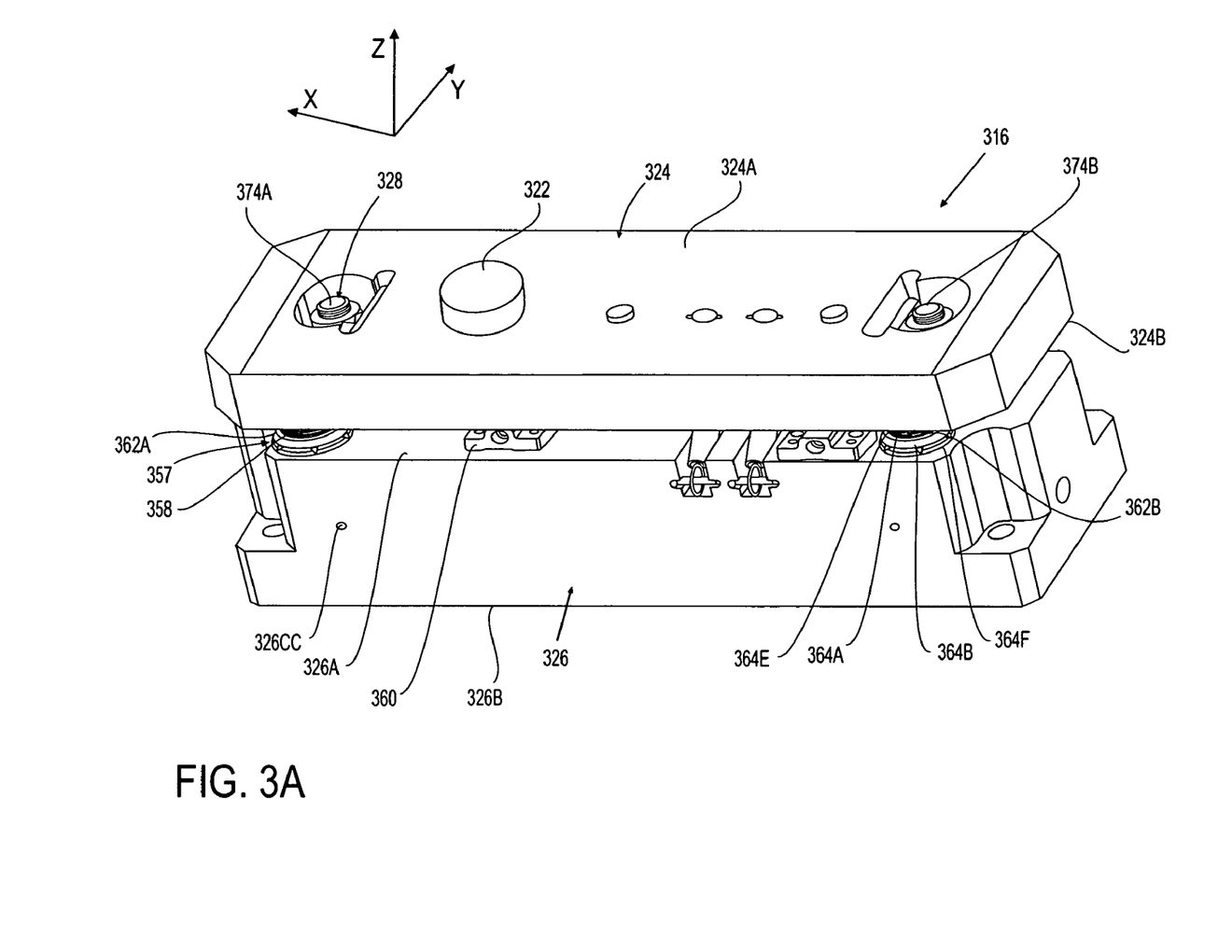
FIG. 3A is a perspective view of yet another embodiment of a device assembly having features of the present invention.
Figure 3B:
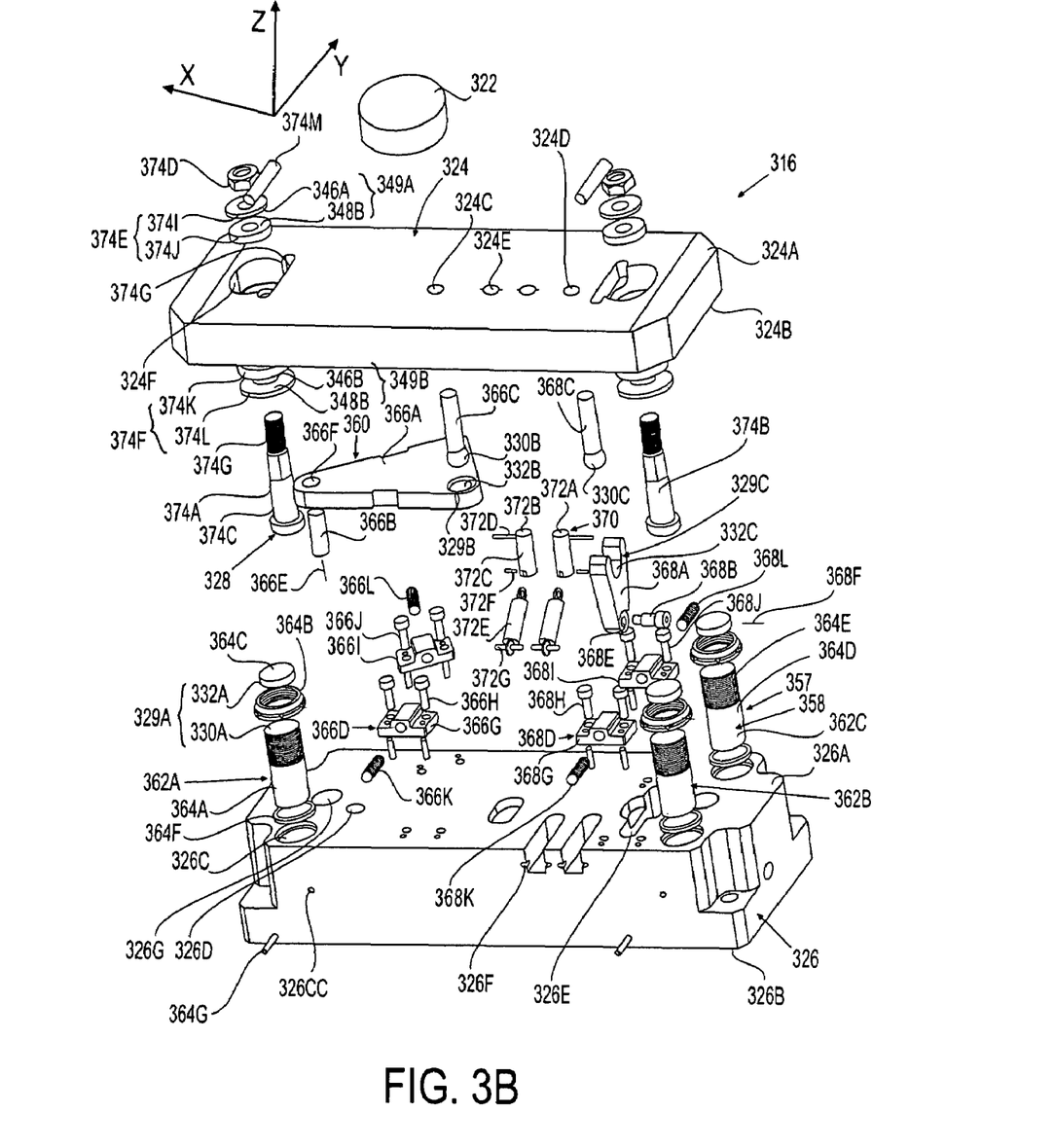
FIG. 3B is an exploded perspective view of the second embodiment of a device assembly of FIG. 3A.

FIG. 3A is a perspective view and FIG. 3B is an exploded perspective view of another embodiment of a device assembly 316 having features of the present invention and a device 322 that is positioned by the device assembly 316. In this embodiment, the device assembly 316 includes a first housing 324 that retains the device 322, a second housing 326, a mover assembly 357 that moves the first housing 324 relative to the second housing 326, and a lock assembly 328 that selectively locks the first housing 324 to the second housing 326. The size, shape, and design of each of these components can be varied to achieve the design requirements for the device assembly 316.

In the embodiment illustrated in FIGS. 3A and 3B, the device assembly 316 allows for the precise positioning of the device 322 about three axes, namely about the X axis, about the Y axis and about the Z axis and along two axes, namely along the Y axis and along the Z axis.

The first housing 324 retains the device 322. In FIGS. 3A and 3B, the first housing 324 is generally rectangular shaped and includes a first housing upper surface 324A and a first housing lower surface 324B. The device 322 can be secured to the upper surface 324A.

The second housing 326 can be secured to the apparatus frame (not shown). In FIGS. 3A and 3B, the second housing 326 is generally rectangular shaped and includes a second housing upper surface 326A and a second housing lower surface 326B.

The mover assembly 357 can be used to move the first housing 324 relative to the second housing 326. The design of the mover assembly 357 can vary. In FIGS. 3A and 3B, the mover assembly 357 includes (i) a first mover subassembly 358 that can be used to move the first housing 324 and the device 322 relative to second housing 326 along the Z axis, about the X axis and about the Y axis, and (ii) a second mover subassembly 360 that can be used to move the first housing 324 and the device 322 relative to second housing 326 about the Z axis, and along the Y axis. With this design, the mover assembly 357 can be used to move the first housing 324 and the device 322 with six degrees of movement. Alternatively, for example, the mover assembly 357 can be designed without one of the mover subassembly 358, 360.

The design of each of the mover subassemblies 358, 360 can be varied pursuant to the teachings provided herein. In FIGS. 3A and 3B, the first mover subassembly 358 includes three spaced apart Z movers, namely a first Z mover 362A, a second Z mover 362B, and a third Z mover 362C that cooperate to move the first housing 324 and the device 322 relative to second housing 326 along the Z axis, about the X axis and about the Y axis.

The design of each of the Z movers 362A-362C can be varied pursuant to the teachings provided herein. In FIGS. 3A and 3B, each of the Z movers 362A-362C includes a ZM shaft 364A, a ZM shaft mover 364B, and a ZM contact pad 364C. In one embodiment, each of the ZM shafts 364A is generally cylindrically shaped and includes (i) a shaft non-threaded region 364D that fits and moves up and down within a corresponding shaft aperture 326C in second housing upper surface 326A of the second housing 326, (ii) a shaft externally threaded region 364E that is engaged by the ZM shaft mover 364B, and a shaft guide surface 330A that engages the ZM contact pad 364C. Additionally, each of the Z movers 362A-364C can include a lock pin 364G that fits in a LP aperture 326CC in the second housing 326. In this embodiment, for each of the Z movers 362A-364C, the lock pin 364G engages a flat area on the shaft non-threaded region 364D and the lock pin allows for movement of the shaft non-threaded region 364D up and down while inhibiting rotation of the ZM shaft 364A.

Further, each ZM shaft mover 364B can be a nut that includes and internally threaded surface that engages with the shaft externally threaded region 364E.

Moreover, each ZM contact pad 364C is generally disk shaped and the first housing lower surface 324B of the first housing 324 is positioned on the top of each ZM contact pad 364C. It should be noted that, in certain embodiments, that the first housing 324 is free to move relative to the ZM contact pads 364C along the X axis and along the Y axis. Additionally, each ZM contact pad 364C includes a pad guide surface 332A that engages and interacts with the corresponding shaft guide surface 330A.

With this design, for each Z mover 362A-362C, rotation of the ZM shaft mover 364B causes the corresponding ZM shaft 364A to move up or down (depending upon direction of rotation) relative to the second housing 326. For example, if all of the ZM shafts 364A are moved at the same rate and in the same direction, the second housing 326 is moved along the Z axis. Alternatively, if the ZM shafts 364A are moved at different rates and/or in alternative directions, the second housing 326 is moved about the X axis or about the Y axis.

Additionally, each of the Z movers 362A-362C can include a contact ring 364F that is positioned around the respective ZM shaft 364A between the second housing 326 and the ZM shaft mover 364B. The contact ring 364F can have a low friction coating or be made of a low friction material. This feature allows for precise and repeatable rotation of each ZM shaft mover 364B and the precise adjustment to the position of the first housing 324.

In one embodiment, for each Z mover 362A-362C, the shaft guide surface 330A and the, pad guide surface 332A cooperate to form a Z movement ball joint 329A that allows for the positioning of the device 222. For example, one of the guide surfaces 330A, 332A can define a portion of a spherical cavity and the other of the guide surfaces 330A, 332A can define a portion of a spherical projection that is sized and shaped to fit within the spherical cavity. In the embodiment illustrated in FIGS. 3A and 3B, the pad guide surface 332A defines a portion of the spherical cavity and the shaft guide surface 330A defines a portion of the spherical projection. With this design, the shaft guide surface 330A fits within and is guided by the pad guide surface 332A. Additionally, one or both of the guide surfaces 330A, 332A can have a low friction coating or be made of a low friction material. This feature allows for precise and repeatable motion between the guide surfaces 330A, 332A.

In FIGS. 3A and 3B, the second mover subassembly 360 includes a pivot plate 366A, a first PP coupler 366B, a second PP coupler 366C, a PP mover assembly 366D, a pivot fork 368A, a first PF coupler 368B, a second PF coupler 368C, and a PF mover assembly 368D that cooperated to move the first housing 324 and the device 322 along the X axis, along the Y axis and about the Z axis. The design of each or these components can be varied pursuant to the teachings provided herein.

In the embodiment illustrated in FIGS. 3A and 3B, the pivot plate 366A is a generally triangular shaped plate. The first PP coupler 366B is a generally cylindrical shaped shaft and defines a PP axis of rotation 366E in which the pivot plate 366A rotates relative to the second housing 326. The first PP coupler 366B can include a lower end that fits in a coupler aperture 326D in the SH upper surface 326B of the second housing 326, and an upper end that fits in a coupler aperture 366F in the pivot plate 336A. The second PP coupler 366C is generally cylindrical pin shaped and provides a pivotable connection between the pivot plate 366A and the first housing 324. The second PP coupler 366C can include an upper end that fits into a coupler aperture 324C in the first housing lower surface 324B of the first housing 324, and a coupler guide surface 330B that engages a PP guide surface 332B on the pivot plate 366A.

In one embodiment, the coupler guide surface 330B and the PP guide surface 332B cooperate to form a PP movement ball joint 329B that allows for the precise and repeatable positioning of the device 222. For example, one of the guide surfaces 330B, 332B can define a portion of a cylindrical cavity and the other of the guide surfaces 330B, 332B can define a portion of a spherical projection that is sized and shaped to fit within the spherical cavity. In the embodiment illustrated in FIGS. 3A and 3B, the PP guide surface 332B defines a portion of a cylinder and the coupler guide surface 330B defines a portion of the spherical projection. With this design, the coupler guide surface 330B fits within and is guided by the PP guide surface 332B. Additionally, one or both of the guide surfaces 330B, 332B can have a low friction coating or be made of a low friction material. This feature allows for precise and repeatable motion between the guide surfaces 330B, 332B.

The PP mover assembly 366D moves the pivot plate 366A about the PP axis of rotation 366E. In FIGS. 3A and 3B, the PP mover assembly 366D includes (i) a first mover plate 366G that is fixedly secured to the second housing upper surface 326A with fasteners 366H, (ii) a second mover plate 366I that is secured to the second housing upper surface 326A with fasteners 366J with the pivot plate 366A positioned therebetween, (iii) a first PP mover 366K, e.g. a externally threaded rod that is threaded into the first mover plate 366G and that engages one side of the pivot plate 366A, and (iv) a second mover 366L, e.g. a externally threaded rod that is threaded into the second mover plate 366I and that engages the other side of the pivot plate 366A. With this design, concurrent rotation of the movers 366K, 366L in opposite directions causes the pivot plate 366A to rotate about the PP axis of rotation 366E about the Z axis.

The pivot fork 368A is shaped somewhat "V" shaped and includes an upper PF guide surface 332C and a lower, coupler aperture 368E that extends through the pivot fork 368A. The first PF coupler 368B attaches the pivot fork 368A to the second housing 326 and provides a PF axis of rotation 368F in which the pivot fork 368A pivots relative to the second housing 326 about the X axis. In this embodiment the second housing 326 includes a PF aperture 326E that receives the bottom of the pivot fork 368A. The first PF coupler 368B can be a bolt that extends through the coupler aperture 368E and is threaded into an internally threaded surface (not shown) in the second housing 326 to pivotable connect the pivot fork 368A to the second housing 326. The second PF coupler 368C can include an upper end that fits into a coupler aperture 324D in the first housing lower surface 324B of the first housing 324, and a coupler guide surface 330C that engages the PF guide surface 332C on the pivot fork 368A.

In one embodiment, the coupler guide surface 330C and the PF guide surface 332C cooperate to form a PF movement joint 329C that allows for relative rotation and movement along the X axis. For example, one of the guide surfaces 330C, 332C can define a portion of a "U" shaped channel and the other of the guide surfaces 330C, 332C can define a portion of a spherical projection that is sized and shaped to fit within the "U" shaped channel. In the embodiment illustrated in FIGS. 3A and 3B, the PF guide surface 332C defines the "U" shaped channel and the coupler guide surface 330C defines a portion of the spherical projection. With this design, the coupler guide surface 330C fits within and is guided by the PF guide surface 332C. Additionally, one or both of the guide surfaces 330C, 332C can have a low friction coating or be made of a low friction material. This feature allows for precise and repeatable motion between the guide surfaces 330C, 332C.

The PF mover assembly 368D causes rotation of the pivot fork 368A bout the PF axis of rotation 368F and the X axis. In FIGS. 3A and 3B, the PF mover assembly 368D includes (i) a first mover plate 368G that is fixedly secured to the SH upper surface 326A with fasteners 368H, (ii) a second mover plate 368I that is secured to the SH upper surface 326A with fasteners 368J with the pivot fork 368A positioned therebetween, (iii) a first PF mover 368K, e.g. a externally threaded rod that is threaded into the first mover plate 368G and that engages one side of the pivot fork 368A, and (iv) a second mover 368L, e.g. a externally threaded rod that is threaded into the second mover plate 368I and that engages the other side of the pivot fork 368A. With this design, concurrent rotation of the movers 368K, 368L in opposite directions causes the pivot fork 368A to rotate about the PF axis of rotation 368F about the X axis.

Additionally, mover assembly 357 can include a bias assembly 370 that urges the housings 324, 326 together and that urges the other components of mover assembly 357 together. In one embodiment, the bias assembly 370 includes a first bias subassembly 372A and a spaced apart second bias subassembly 372B. Alternatively, the bias assembly 370 could be designed with more than two or less than two bias subassemblies 372A, 372B.

In FIGS. 3A and 3B, each of the bias subassemblies 372A, 372B includes (i) a first bias pin 372C that extends through a pin aperture 324E in the first housing 324, (ii) a first latch pin 372D that extends through an upper hole in the first bias pin 372C to hold the first bias pin 372C in the pin aperture 324E, (iii) a resilient member 372E (e.g. a spring or elastic member) that is secured to a bottom of the first bias pin 372C with a second latch pin 372F, and (iv) a third latch pin 372G that fits in a pin slot 326F of the second housing 326 to secure the bottom of the resilient member 372E to the second housing 326. With this design, the bias subassemblies 372A, 372B urge the housings 324, 326 together.

The lock assembly 328 selectively and accurately locks the first housing 324 to the second housing 326 after the first housing 324 has been precisely positioned. The design of the lock assembly 328 can vary pursuant to the teaching provided herein.

In one embodiment, the lock assembly 328 includes a first lock subassembly 374A and a spaced apart second lock subassembly 374B. Alternatively, the lock assembly 328 could be designed with more than two or less than two lock subassembly 374A, 374B.

In FIGS. 3A, 3B, each of the lock subassemblies 374A, 374B includes a fastener 374C, a nut 374D, an upper joint assembly 374E, and a lower joint assembly 374F. In this embodiment, for each lock subassembly 374A, 374B, (i) the fastener 374C is a bolt that extends through a lower bolt aperture 326F in the second housing 326, and a upper bolt aperture 324F in the first housing 324; (ii) the nut 374D threads onto a fastener externally threaded surface 374G of the fastener 374C; (iii) the upper joint assembly 374E is positioned on the fastener 374C between the nut 374D and the first housing 324, and the upper joint assembly 374E includes a top washer 374I and an adjacent bottom washer 374J that engage each other; and (iv) the lower joint assembly 374F is positioned on the fastener 374C between the second housing 326 and the head of the fastener 374C, and the lower joint assembly 374E includes a top washer 374K arid an adjacent bottom washer 374L that engage each other.

In one embodiment, for the upper joint assembly 374E, the top washer 374I includes a first engagement surface 346A that is engaged by a second engagement surface 348A of the bottom washer 374J. Somewhat similarly, for the lower joint assembly 374F, the top washer 374K includes a first engagement surface 346B that is engaged by a second engagement surface 348B of the bottom washer 374L. In one embodiment, (i) the engagement surfaces 346A, 348A of the upper joint assembly 374E cooperate to form an upper locking ball joint 349A, and (ii) the engagement surfaces 346B, 348B of the lower joint assembly 374F cooperate to form a lower locking ball joint 349B. Further, the locking ball joints 349A, 349B cooperate to allow for precise locking of the housings 324, 326 together. Stated in another fashion, this unique arrangement allows the lock assembly 328 to clamp the housings 324, 326 together irregardless of the relative positions of the housings 324, 326 while maintaining the positions of the housings 324, 326.

For example, for the upper joint assembly 374E, one of the engagement surfaces 346A, 348A can define a portion of a spherical cavity and the other of the engagement surfaces 346A, 348A can define a portion of a spherical projection that is sized and shaped to fit within the spherical cavity. In FIG. 3B, the second engagement surface 348A defines a portion of the spherical cavity and the first engagement surface 346A defines a portion of the spherical projection. With this design, the first engagement surface 346A fits within and precisely engages the second engagement surface 348A.

Somewhat similarly, for the lower joint assembly 374F, one of the engagement surfaces 346B, 348B can define a portion of a spherical cavity and the other of the engagement surfaces 346A, 348B can define a portion of a spherical projection that is sized and shaped to fit within the spherical cavity. In FIG. 3B, the first engagement surface 346B defines a portion of the spherical cavity and the second engagement surface 348B defines a portion of the spherical projection. With this design, the second engagement surface 348B fits within and precisely engages the second engagement surface 346B. It should be noted that one or more of the engagement surfaces 346A, 346B, 348A, 348B can include a low friction surface or be made of a low friction material to allow for easy relative motion.

Additionally, each lock subassembly 374A, 374B can include a lock pin 374M that fits into a pin slot 324G in the first housing upper surface 324A of the first housing 324 against the respective nut 374D to inhibit rotation of the nut 374D.

Figure 3C:
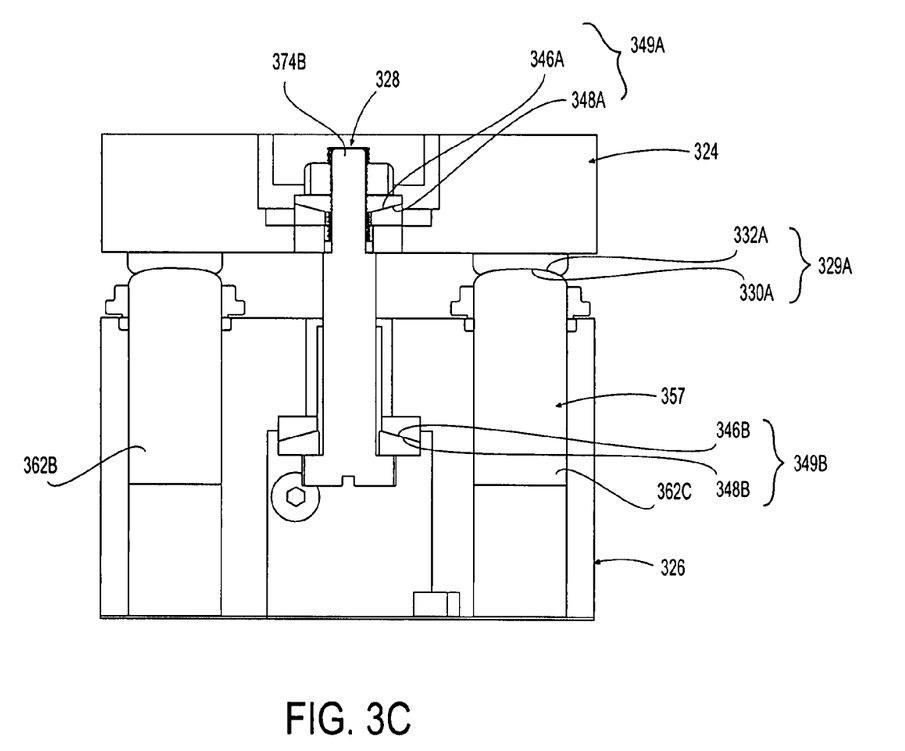
FIG. 3C is a cut-away view of the device assembly of FIG. 3A.

FIG. 3C is a cut-away view taken on line 3C in FIG. 3A illustrating the first housing 324, the second housing 326, a portion of the lock assembly 328, and a portion of the mover assembly 357. FIG. 3C also illustrates that the shaft guide surface 330A and pad guide surface 332A cooperate to form the Z movement ball joint for each Z mover 362A, 362B, 362C (only two are illustrated in FIG. 3C). As a result thereof the first housing 324 can pivot relative to the second housing 326.

Further, for each lock subassembly 374A, 374B (only one is illustrated in FIG. 3C) (ii) the engagement surfaces 346A, 348A cooperate to form the upper locking ball joint 349A, and (iii) the engagement surfaces 346B, 348B cooperate to form the lower locking ball joint 349B. With this design, the lock assembly 328 can lock the housings 24, 326 together irregardless of the relative position and without urging the position of the first housing 324 to change.

It should be noted that in certain embodiments, the device used to position the first housing 224, 324 relative to the second surface 226, 326 is separate and independent to the lock assembly 228, 328. With this design, movement is independent from locking. This allows for more precise positioning and locking of the first housing 224, 324. Further, the assembly can be more robust because the two systems are independent.

While the particular apparatus 10 is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device assembly for positioning a device for a precision apparatus, the device assembly comprising:
    a first housing that retains the device;
    a second housing;
    a movement ball joint that facilitates movement of the first housing relative to the second housing; and
    a locking assembly that facilitates locking of the first housing to the second housing, wherein the locking assembly includes a plurality of spaced apart fasteners that cooperate to selectively lock the first housing to the second housing, and wherein each fastener includes a curved engagement surface that engages at least one of the housings.

2. The device assembly of claim 1 wherein the movement ball joint guides movement of the first housing relative to the second housing.

3. The device assembly of claim 1 wherein the first housing includes a first guide surface and the second housing includes a second guide surface, the guide surfaces cooperating to form the movement ball joint.

4. The device assembly of claim 3 wherein at least one of the guide surfaces encircles the device.

5. The device assembly of claim 3 wherein the guide surfaces and the device are substantially concentric.

6. The device assembly of claim 3 wherein the second guide surface of the second housing includes a device aperture and the device is positioned near the device aperture.

7. The device assembly of claim 1 wherein the device is an optical element.

8. A precision apparatus comprising a beam source that generates a beam, and the device assembly of claim 7 redirecting the beam.

9. The device assembly of claim 1 wherein the locking assembly includes three spaced apart fasteners that cooperate to selectively lock the first housing to the second housing.

10. The device assembly of claim 9 wherein the first housing includes three, spaced apart first engagement surfaces and each fastener includes the curved engagement surface, and wherein each first engagement surface defines a portion of a spherical cavity and each curved engagement surface defines a portion of a spherical projection that fits at least partly into one of the first engagement surfaces.

11. The device assembly of claim 10 wherein each fastener includes a washer that defines the curved engagement surface.

12. The device assembly of claim 1 wherein each curved engagement surface forms a portion of a sphere.

13. A device assembly for redirecting a beam of a precision apparatus that includes an apparatus frame, the device assembly comprising:
    a device that includes an optical element;
    a first housing that retains the device, the first housing including a first guide surface;
    a second housing that is coupled to the apparatus frame, the second housing including a second guide surface that cooperates with the first guide surface to form a movement ball joint that guides movement of the first housing relative to the second housing; the second guide surface including a device aperture that is positioned adjacent to the; and a plurality of spaced apart fasteners that cooperate to selectively lock the first housing to the second housing, wherein each fastener includes a curved engagement surface that engages at least one of the housings.

14. The device assembly of claim 13 wherein each guide surface forms a portion of a sphere.

15. The device assembly of claim 13 wherein at least one of the guide surfaces encircles the device.

16. A precision apparatus comprising a beam source that generates a beam, and the device assembly of claim 13 redirecting the beam.

17. The device assembly of claim 13 comprising at least three spaced apart fasteners that cooperate to selectively lock the first housing to the second housing.

18. The device assembly of claim 17 wherein the first housing includes three, spaced apart first engagement surfaces and each fastener includes the curved engagement surface, and wherein each first engagement surface defines a portion of a spherical cavity and each curved engagement surface defines a portion of a spherical projection that fits at least partly into one of the first engagement surfaces.

19. The device assembly of claim 18 wherein each fastener includes a washer that defines the curved engagement surface.

20. The device assembly of claim 13 wherein the curved engagement surface forms a portion of a sphere.

21. A device assembly for positioning a device for a precision apparatus, the device assembly comprising:

a first housing that retains the device;

a second housing;

a movement ball joint that facilitates movement of the first housing relative to the second housing along a first axis, about a second axis, and about a third axis; and a lock assembly that facilitates locking of the first housing to the second housing, wherein the locking assembly includes a plurality of spaced apart fasteners that cooperate to selectively lock the first housing to the second housing, and wherein each fastener includes a curved engagement surface that engages at least one of the housings.

22. The device assembly of claim 21 wherein the first housing moves relative to the movement ball joint along the second axis.

23. The device assembly of claim 22 wherein the first housing moves relative to the movement ball joint about the first axis.

24. The device assembly of claim 21 wherein the device is an optical element.

25. A precision apparatus comprising a beam source that generates a beam, and the device assembly of claim 24 redirecting the beam.

26. A method for positioning a device, the method comprising the steps of:

retaining the device with a first housing;

coupling a second housing to an apparatus frame;

facilitating movement of the first housing relative to the second housing with a movement ball joint; and locking the first housing to the second housing utilizing a locking assembly, the locking assembly including a plurality of spaced apart fasteners that cooperate to selectively lock the first housing to the second housing, and wherein each fastener includes a curved engagement surface that engages at least one of the housings.

27. The device assembly of claim 21 wherein the locking assembly includes three spaced apart fasteners that cooperate to selectively lock the first housing to the second housing.

28. The device assembly of claim 27 wherein the first housing includes three, spaced apart first engagement surfaces and each fastener includes the curved engagement surface, and wherein each first engagement surface defines a portion of a spherical cavity and each curved engagement surface defines a portion of a spherical projection that fits at least partly into one of the first engagement surfaces.

29. The device assembly of claim 21 wherein the curved engagement surface forms a portion of a sphere.

* * * * *

UNITED STATES PATENT AND TRADEMARK OFFICE
CERTIFICATE OF CORRECTION

PATENT NO. : 7,520,063 B2
APPLICATION NO. : 11/717863
DATED : April 21, 2009
INVENTOR(S) : Bing Zheng et al.

It is certified that error appears in the above-identified patent and that said Letters Patent is hereby corrected as shown below:

Claim 13, Column 13, Line 3, after the word "the" please insert the following:
-- device --.

Signed and Sealed this

Eighteenth Day of August, 2009

David J. Kappos
*Director of the United States Patent and Trademark Office*